Patented May 27, 1930

1,760,427

UNITED STATES PATENT OFFICE

ROBERT C. MATLOCK, JR., OF BLOOMFIELD, NEW JERSEY, ASSIGNOR TO WESTINGHOUSE LAMP COMPANY, A CORPORATION OF PENNSYLVANIA

PROCESS FOR PREVENTING WEATHERING OF GLASS

No Drawing.    Application filed October 17, 1928. Serial No. 313,187.

This invention relates to the art of "frosting" glass articles and more particularly to the "frosting" of glass articles such as incandescent lamp bulbs and the like thin glass articles wherein it is desirous of imparting to the surface thereof a light diffusing surface without impairing the mechanical strength of the relatively thin glass envelope. More particularly this invention comprises an improvement in the process of producing such a light diffusing surface by means of what is commonly known in the art as a "fluoride etch" and consists essentially in a processing of said etched articles subsequent to the etching operation by a suitable fluid solvent whereby the articles are rendered substantially resistant to corroding influences when subsequently exposed to the atmosphere.

The common practice heretofore proposed has been to first subject the glass to the etching action of a highly concentrated fluoride solution to form the initial surface "frost" thereon, and to follow this step with a second etching operation using a much less concentrated solution to effect what is known in the art as a "strengthening" of the etched glass article. These two operations have been necessary due to the fact that the glass structure at the conclusion of the initial etch with concentrated fluoride is substantially brittle and subject to ready fracture upon impact shock. This brittleness is ascribed to the formation during the concentrated fluoride etch of sharp angular surface crystals which were non-resistant to shock. By following the deeply corroding etch with a second etch with less concentrated solutions these angular crystal faces were rounded off, so to speak, and the tendency to shatter on impact shock reduced, and the glass body was thereby substantially strengthened.

In the commercial application of this general process of etching incandescent lamp bulbs it is found that when such bulbs are immediately employed and utilized in lamp manufacture that the strength and resistance to shock are entirely satisfactory. When such etched lamp bulbs, however, are allowed to remain unused for a period of time and exposed to the atmosphere it is found that the impact shock resisting qualities of the etched glass are gradually lost, and frequently after relatively short periods of time the strength of the glass has deteriorated down to and below that which is commonly observed or noted in the material following the first acid etch and prior to the so-called strengthening etch. The strength or resistance of these weakened bulbs may be frequently restored by giving them a supplementary washing with acidified water. This, however, is undesirable from the standpoint of manufacturing costs and efficiency of production and requires equipment not usually present in lamp manufacturing divisions.

It is one of the objects of this invention to substantially prevent or to effectually retard the deterioration in the strength of fluoride etched glassware upon exposure to the atmosphere.

It is another object of this invention to provide a simple effectual process whereby fluoride etched glassware may be substantially rendered resistant to physical deterioration with age and exposure to the atmosphere.

Another object of this invention is to improve the process of surface etching of glass articles, particularly bulbs, so that the inherent strength and elasticity of said glass article is substantially retained unimpaired with age or exposure to atmospheric gases.

Another object of this invention is to substantially eliminate deteriorating weathering actions from etched incandescent lamp bulbs.

Other objects and advantages will become apparent as the invention is more fully disclosed.

I have found that the so-called "weathering" action resulting in loss of strength in glassware superficially etched by the above mentioned fluoride process is caused by the absorption of moisture and carbon oxides from the atmosphere by the etched surfaces. By hydrolysis and progressive reaction between the etched surfaces and the absorbed gases, a condition is promoted which results in a noticeable weakening of the glass, particularly after heating as in the sealing in and exhaust operations in the manufacture of incandescent lamps.

The particular rate at which this weakening action takes place varies from day to day dependent upon atmospheric conditions, becoming markedly accelerated during days of high humidity and markedly reduced during days of low humidity.

In the general fluoride frosting process the essential reaction taking place is interaction between the sodium silicate and the acid fluoride or hydrofluoric acid in the following manner:

$$Na_2SiO_3 (Glass) + 6HF \rightarrow Na_2SiF_6 + 3H_2O$$

The double sodium silico-fluoride salt ($Na_2SiF_6$) thus formed is relatively difficultly soluble in hot or cold water and is insoluble in hydrofluoric acid solutions. In the event that other alkaline or alkaline earth metal silicates are employed as constituents of the glass there will be formed similar double-alkaline and alkaline earth metal silico-fluorides. These compounds are retained therefore, as components of the etched surface and assist in the light diffusing properties thereof.

In contact with atmospheric gases (moisture and carbon oxides) it is believed that this compound becomes hydrolyzed or decomposed according to the following reaction:

$$Na_2SiF_6 + H_2CO_3 \rightarrow Na_2CO_3 + H_2SiF_6$$
$$H_2SiF_6 + Heat \rightarrow 2HF + SiF_4$$

or $$CaSiF_6 + H_2CO_3 \rightarrow CaCO_3 + H_2SiF_6$$

The hydrofluoric acid liberated by the thermal decomposition of the double alkali or alkaline earth fluo-silicate may be evaporated or again react with the glass (sodium silicate) to yield more sodium silico-fluoride and the cycle again repeated until finally the the deep sharp faced inter-crystalline etch is again obtained and the strength of the bulb in this manner progressively destroyed with lengthening time interval of exposure to the atmosphere.

Another reaction that possibly takes place is interaction of the glass with the carbonic acid of the atmosphere to form sodium carbonate and silicic acid which breaks down into moisture and silicon dioxide according to the following equation:

$$Na_2SiO_3 + H_2CO_3 \rightarrow Na_2CO_3 + H_2SiO_3$$
$$H_2SiO_3 + Heat \rightarrow H_2O + SiO_2$$

The above type reactions are given to illustrate what may conceivably take place during the so-called "weathering" action. Regardless of the true reaction or theory involved I have found that excessive and increased concentrations of moisture and carbon oxides in the atmosphere accelerate the so-called weathering effect of such etched surfaces and articles and I have further determined that if I substantially remove from the frosted surface of the glass the bulk of the relatively insoluble sodium silico fluoride ($Na_2SiF_6$) compound formed during the etching reaction or the double alkaline and alkaline earth metal silico fluoride compounds similarly formed which compounds have not heretofore been removed by prior washing methods, I may substantially eliminate or materially retard this "weathering" action upon the glass surfaces and consequent loss in mechanical strength and elasticity.

In accordance with my invention I subject the etched glass surfaces to a third washing step immediately following the second or so-called strengthening etch of the prior methods, which step is comprised substantially of a fluid non-reactive with respect to sodium silicate or glasses in general but substantially reactive with or having a pronounced solubility for the double alkaline or alkaline earth metal silico fluoride compounds formed by the etching process and thereafter wash with water and dry in the usual manner. Specifically, I prefer to employ solutions of inorganic ammonium compounds such as ammonium nitrate ($NH_4NO_3$), ammonium sulfate (($NH_4)_2SO_4$), ammonium acid phosphate (($NH_4)_2PHO_4$) which are highly soluble towards such double alkaline silico fluoride compounds. Or I may also employ organic ammonium salts such as the acetate, tartrate and oxalate compounds. More particularly I prefer to employ ammonium chloride or ammonium sulfate, the former of which has been found to be more commercially practical.

The reaction involved is substantially one of double decomposition based upon mass action wherein the preponderance of the ammonium compound over the double silico fluoride insures rapid and practically complete conversion, according to the following type reactions:

$$(NH_4)_2SO_4 + Na_2SiF_6 \leftrightarrows (NH_4)_2SiF_6 + Na_2SO_4$$

or $$2NH_4Cl + Na_2SiF_6 \leftrightarrows (NH_4)_2SiF_6 + 2NaCl$$

Specifically I prefer to employ the ammonium chlorides ($NH_4Cl$) as a washing compound rather than the sulfate because of the greater solubility of the sodium chloride than the sodium sulfate. Moreover, the speed of the reaction obtained through the use of the ammonium chloride is much greater and consequently more satisfactory on commercial application.

I have found that I may either employ a cold solution of ammonium chloride for a longer interval of time or a warm solution for a shorter interval of time and obtain thereby identical results from a standpoint of inhibiting or retarding the weathering action. For greater speed and general operating efficiency in the application of this process to spray methods of washing I prefer to employ a warm saturated solution of ammonium chloride at temperatures from 60° C. to 110° C.

I prefer to employ the saturated solution of the ammonium salt as the degree of concentration by increasing the mass action effect accelerates the rate of double decomposition of the double alkali and alkaline earth silico fluoride compounds and thereby shortens the time of exposure to the solution.

Whereas these double silico fluoride compounds are substantially components of the etch and removal therefrom detracts or substantially lessens the desired diffusion effect of the etched surface, it is essential to limit the time interval of the washing in accordance with the diffusion effects desired and the calculated or average time interval that may elapse between the manufacture of the etched bulb and assembly into the finished incandescent lamp. This is a matter of adjustment as to actual factory production schedules.

As a specific embodiment of my invention I subject the etched and strengthened glass article (incandescent lamp bulb) to a third washing step comprised substantially of a saturated solution of ammonium chloride, in such manner and for such a time interval required to dissolve or remove the major or desired portion of the deleterious double alkali silico fluoride compounds from the etched surface, and subsequently wash the article thoroughly with pure water and dry.

By this operation I am substantially able to remove the weathering effects heretofore observed in such fluoride etched glass articles or substantially retard the rate thereof as desired.

As an indication of the usefulness and efficiency of my invention in preventing and retarding the so-called weathering action on incandescent lamp bulbs the following table showing the relative loss in strength of two series of bulbs, one lot of which were processed as by the above described process and the other lot the regular product unprocessed.

*Strength by ivory ball strength tester method*

|  | Processed bulbs | Regular product |
|---|---|---|
|  | Units | Units |
| Test No. 1: |  |  |
| Start | 23 | 23 |
| 1st day | 28 | 9 |
| 2nd day | 27 | 7 |
| 4th day | 10 | 8 |
| 5th day | 12 | 4 |
| 12th day | 7 | 2.6 |
| Test No. 2: |  |  |
| Start | 29+ | 27 |
| 1st day | 32 | 18 |
| 2nd day | 14 | 14 |
| 7th day | 15 | 8 |
| 12th day | 13 | 5 |

The bulbs were stored in air under semi-tropic conditions at 85° F. with 75% relative humidity or approximately 136 grains of $H_2O$ per lb. of dry air. This represents what is known as a forced life test under known aggravated conditions. Three to five bulbs were used in each daily test and the bulbs were first heated and then cooled before testing.

As may be noted, the processed bulbs show a marked decrease in the rate of loss of strength under this method of treating. Under this method of testing all bulbs having a strength of 10 units are considered satisfactory for use in incandescent lamps. Below this figure the bulb must be processed to restore the strength by an acid wash.

In each of the tests noted above it will be seen that the unprocessed bulbs rapidly lost their strength so that at the end of a week they were unsuitable for use, whereas the processed bulbs were still of sufficient strength to be used in lamp making. In test lot Number 2 the processed bulbs at the end of 12 days were over 2½ times as strong as the unprocessed bulbs. Under normal conditions of temperature and moisture and $CO_2$ concentration in the air this represents an increase in storage life of the etched bulbs of months rather than the days herein noted.

Having broadly outlined the scope of my invention and specifically described an embodiment thereof in the application of the same to the improvement in the strength quality and resistance to deterioration by weathering of etched incandescent lamp bulbs it is apparent that many departures of the specific method or application thereof may be made without substantially departing from the nature of the invention as described in the annexed claims.

What is claimed is:

1. The method of frosting glass articles which comprises subjecting said article to the action of a highly concentrated fluoride etching solution for a limited interval of time, followed by a second etching action by a lesser strength fluoride solution for another interval of time and thereafter subjecting the etched glass surface to the action of a chemical solvent inert with respect to said glass but substantially capable of removing from the etched surface the double alkali and alkaline earth metal silico fluorides formed by the said etching reactions thereon.

2. The method of frosting glass articles which comprises subjecting said article to the action of a highly concentrated fluoride etching solution for a limited interval of time, followed by a second etching action by a lesser strength fluoride solution for another interval of time and thereafter subjecting the etched glass surface to the action of a chemical solvent inert with respect to said glass but substantially capable of reacting with the double alkali and alkaline earth metal silico fluoride compounds formed in the etching process to form water soluble products therewith.

3. The method of frosting glass articles which comprises subjecting said article to the action of a highly concentrated fluoride etching solution for a limited interval of time, followed by a second etching action by a lesser strength fluoride solution for another interval of time and thereafter subjecting the etched glass surface to the action of a chemical solvent inert with respect to said glass but substantially having a solubility with respect to alkali and alkaline earth metal silico fluoride compounds.

4. The method of frosting glass articles which comprises subjecting said article to the action of a highly concentrated fluoride etching solution for a limited interval of time, followed by a second etching action by a lesser strength fluoride solution for another interval of time and thereafter subjecting the etched glass surface to the action of a chemical solvent inert with respect to said glass but substantially comprised of inorganic ammonium compounds.

5. The method of frosting glass articles which comprises subjecting said article to the action of a highly concentrated fluoride etching solution for a limited interval of time, followed by a second etching action by a lesser strength fluoride solution for another interval of time and thereafter subjecting the etched glass surface to the action of a chemical solvent inert with respect to said glass but substantially comprised of concentrated solutions of inorganic ammonium compounds.

6. The method of frosting glass articles which comprises subjecting said article to the action of a highly concentrated fluoride etching solution for a limited interval of time, followed by a second etching action by a lesser strength fluoride solution for another interval of time and thereafter subjecting the etched glass surface to the action of a chemical solvent inert with respect to said glass but substantially comprised of ammonium chloride.

7. The method of frosting glass articles which comprises subjecting said article to the action of a highly concentrated fluoride etching solution for a limited interval of time, followed by a second etching action by a lesser strength fluoride solution for another interval of time and thereafter subjecting the etched glass surface to the action of a chemical solvent inert with respect to said glass but substantially comprised of a concentrated solution of ammonium chloride.

8. The method of frosting glass articles which comprises subjecting said article to the action of a highly concentrated fluoride etching solution for a limited interval of time, followed by a second etching action by a lesser strength fluoride solution for another interval of time and thereafter subjecting the etched glass surface to the action of a chemical solvent inert with respect to said glass but substantially comprised of a warm concentrated solution of ammonium chloride.

9. The step in the process of etching glass with fluoride solutions which comprises treating the etched surface to remove therefrom the double alkali and alkaline earth metal silico fluoride component of the etched surface.

10. The step in the process of etching glass with fluoride solutions which comprises treating the etched surface with a solution of an inorganic ammonium salt.

11. The step in the process of etching glass with fluoride solutions which comprises treating the etched surface with a concentrated solution of an ammoniacal compound.

12. The step in the process of etching glass with fluoride solutions which comprises treating the etched surface with a warm saturated solution of an ammoniacal salt capable of reacting with and removing therefrom the double alkali silico fluoride.

13. The step in the process of etching glass with fluoride solutions which comprises treating the etched surface with a warm saturated solution of ammonium chloride to substantially react with and to remove therefrom the double alkali silico fluoride component of the etched surface.

14. The method of inhibiting the weathering of fluoride etched glass surfaces which comprises eliminating the alkali-silico fluoride component of said fluoride etched surface prior to exposure to atmospheric gases.

15. The method of reducing the deteriorating effect of the atmospheric gases upon fluoride etched surfaces which comprises treating said etched surface prior to exposure to said atmospheric gases with a solution of an inorganic ammoniacal salt in such manner as to substantially remove from said etched surface the major portion of the double alkali silico fluoride content of said etched surface.

16. The method of reducing the deteriorating effect of the atmospheric gases upon fluoride etched surfaces which comprises treating said etched surface prior to exposure to said atmospheric gases with a warm saturated solution of ammonium chloride in such manner as to substantially remove from said etched surface the major portion of the double alkali silico fluoride content of said etched surface.

In testimony whereof, I have hereunto subscribed my name this 12th day of October, 1928.

ROBERT C. MATLOCK, Jr.